Nov. 9, 1965   K. EKLUND   3,217,135
ELECTRON BEAM WELDING AT ATMOSPHERIC PRESSURES
Filed Dec. 29, 1961   2 Sheets-Sheet 1

INVENTOR
KARL EKLUND

BY Hurvitz + Rose
ATTORNEYS

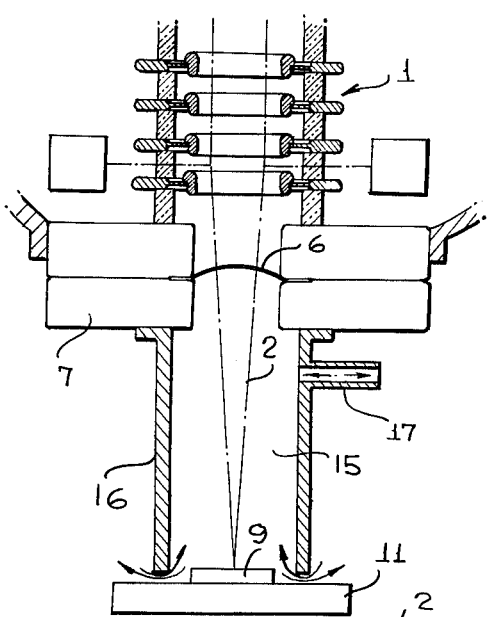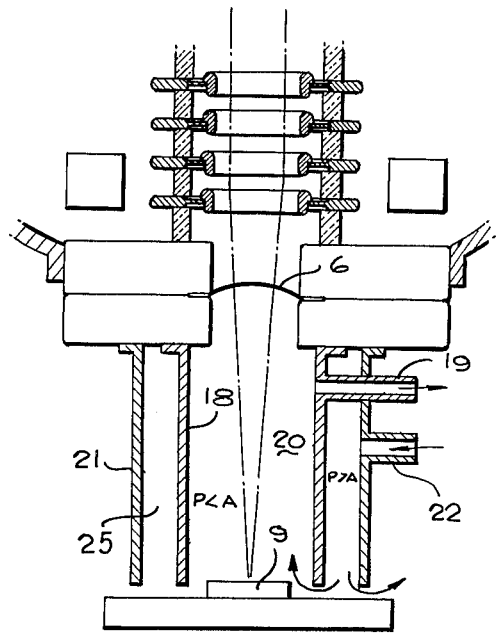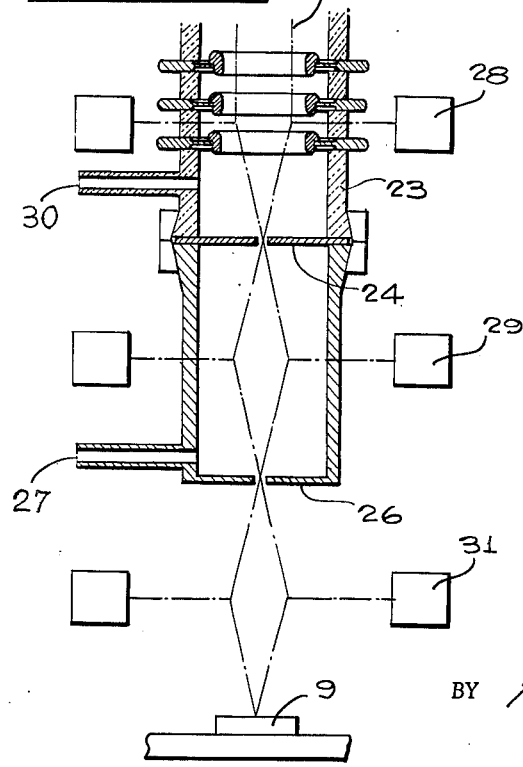

United States Patent Office 3,217,135
Patented Nov. 9, 1965

3,217,135
ELECTRON BEAM WELDING AT
ATMOSPHERIC PRESSURES
Karl Eklund, Hempstead, N.Y., assignor to Radiation Dynamics, Inc., Westbury, Long Island, N.Y., a corporation of New York
Filed Dec. 29, 1961, Ser. No. 163,204
6 Claims. (Cl. 219—121)

The present invention relates to welding methods and apparatus and, more particularly, to a method and apparatus for electron beam welding in gaseous media at atmospheric or near atmospheric pressures.

With the advent of aero-space materials, which are characterized by unusually high resistance to thermal effects, a great deal of effort has been expended in the development of techniques suitable for welding these materials. Such techniques must be capable of delivering large amounts of energy to the precise location to be welded since thermal conduction cannot be relied upon to produce melting of the materials in regions adjacent the area to which the energy is applied.

Electron beam welding methods and apparatus are ideally suited to the solution of this problem since conventional magnetic and electrostatic lenses may be employed to concentrate the electron beam sufficiently to obtain the requisite energy. Conventional beam positioning and beam sweeping techniques may then be employed to provide for precise positioning and movement of the beam.

The difficulty with the welding techniques disclosed in the prior art resides in the fact that the welding must normally take place in an evacuated region; that is, in a vacuum or near vacuum. It has been the experience with prior art apparatus and methods that attempts to weld in a gaseous media at atmospheric or near-atmospheric pressures results in considerable scattering of the beam which defeats the ability to produce high energy concentrations in precise locations. The inability to employ the prior art beam welding apparatus for welding materials under atmospheric conditions introduces difficulties in utilizing the techniques on a production or even semi-production basis since the feed of the workpieces into and retrieval from an evacuated region materially slows any production process. There have been literature references to electron beam machines for welding under atmospheric conditions, however, as a practical matter these machines are not in use since, in order to maintain the high power density required of the beam, the workpiece must be maintained almost in contact with the mechanism, such as a Leonard window or vacuum stretch, through which the beam is extracted from the evacuated region in which the beam is formed. As a result of this necessity for maintaining the workpiece extremely close to the extraction apparatus, it has been found difficult to utilize the apparatus in production work.

Another difficulty with the prior art systems, in which it is attempted to weld in the atmosphere, is that it is almost impossible to utilize the Leonard window technique for extracting the electron beam since the highly concentrated beam, in passing through the window, produces such severe local heating that the window is rapidly destroyed. Thus, it is necessary to normally utilize vacuum stretch techniques which, due to the fact that the beam is withdrawn through regions of increasing pressure, tends to and does materially reduce the energy in the beam at the point at which it is available for welding.

It is therefore an object of the present invention to provide a method and apparatus for electron beam welding in regions at atmospheric or near atmospheric pressures in which the workpiece may be positioned at convenient working distances from the beam extraction apparatus without material reduction in beam energy.

In accordance with one aspect of the present invention, it has been found that, if a workpiece is maintained at a distance from the beam extraction apparatus equal to no more than 15 percent and preferably no more than 10 percent of the electron beam range, there is no material loss of energy or focus of the beam and efficient beam welding may be carried out under atmospheric conditions. The electron beam range is defined as the distance in which a beam of electrons is attenuated sufficiently by scattering or absorption by the molecules of the gaseous media to be essentially undetectable by conventional electron beam detection techniques. Thus, for instance, if the electron range of an electron beam is 100 centimeters in air and the beam is extracted from the accelerator through a foil or Leonard window then, by maintaining the workpiece at a distance of approximately 10 centimeters from the window, there is substantially no loss of energy of the beam. It should be noted that the electron range of a beam is a function of the electron energy and the density of the gaseous medium. In the example cited above, the gaseous media is air and the pressure of the air was atmospheric. In order to achieve an electron range of 100 centimeters under these conditions, it is necessary to utilize an electron beam having an energy of .4 mev., this energy being considerably greater than the energy normally employed in electron beam welding apparatus. More specifically, most electron beam welding equipment presently available operates with beam energies in a range of .05 to .1 mev. which provide electron beam ranges of approximately 15 centimeters in air with the .1 mev. rating, and an almost non-existent range in air at energies of .05 mev. It is thus seen that the prior art welding apparatus is not suitable for utilization with the method of the present invention and electron accelerators specifically designed for such high energy operation must be employed. An example of such an apparatus is the Dynamitron which is the subject matter of U.S. Patent No. 2,875,394 issued February 24, 1959 to Marshall R. Cleland.

The specific electron beam energy utilized for a particular welding procedure depends primarily upon the energy required to be dissipated to effect welding. Therefore, it is not intended to limit the upper range of energies of the electron beam but only to limit the lower range to that which permits electron beam welding at atmospheric or near atmospheric pressures in a physically convenient system; that is, in an assembly or facility in which the work piece may be located at convenient distances from the electron beam extraction mechanism. In determining a convenient distance from the work piece for the electron beam mechanism, a further problem must be taken into account. As previously indicated, where foil or Leonard windows are employed in apparatus providing high energy beams, a problem is encountered due to over-heating of the window as a result of the energy of the concentrated beam. In accordance with a second feature of the present invention, this problem is avoided by bringing the beam through the window in a de-focused condition and locating the work piece a sufficient distance from the extraction mechanism to permit the beam to be focused over that distance. The beam focusing apparatus may be a magnetic lens located so as to exert a focusing effect upon the beam either as it proceeds through the vacuum region or through the atmospheric region of its path or both. If, however, the beam focusing magnet or structure is located so as to affect the beam within the vacuum region, the magnets must be located close to the window relative to the location of the work piece so that little focusing occurs prior to passage of the beam through the window. Otherwise, as indicated above, the window will be destroyed by concentration of the beam. Thus, in a practical system employing a Leonard window as the extraction apparatus, the energy of the electron beam must be such that, when the work piece is located at 10 percent of the electron beam range, there is a sufficient distance between the Leonard window and the work piece to permit a commercially or economically feasible magnetic lens structure to produce the requisite focusing or concentration of the beam externally of the window.

Where a vacuum stretch apparatus is to be employed as the electron beam extraction mechanism, the problem of electron beam range and location of the work piece from the end region of the stretch mechanism is complicated by several factors. First of all, as indicated above, the electron beam range is a function of the density of the medium through which the beam proceeds. The density of the gaseous medium is in turn a function of the pressure of the medium and the molecular weight of the gas. For instance, the electron range has been given as 100 cm. for a .4 mev. beam in air. The range is considerably greater in a helium atmosphere whose density is approximately one-eighth of that of air under the same conditions of temperature and pressure. On the other hand, the range in air of the beam is increased if the air is at a lower pressure and therefore its density is reduced. In extracting an electron beam from an evacuated region through a vacuum stretch apparatus, the various regions of the stretch are at increasing pressures so that it is necessary to calculate the range of the beam for the specific set of pressures and lengths of each of the regions and the gaseous media in each of the regions. Although the total range of the electron beam from the point at which the beam exits from the highly evacuated acceleration region is greater under these circumstances than in a Leonard window arrangement, the range of the beam externally of the stretch mechanism if of necessity less than it is with the Leonard window arrangement due to scattering and absorption in stretch regions. Thus, under these circumstances the beam must either be of higher energy so as to be able to place the work piece at a specific location or the work piece must be moved closer to the end of the vacuum stretch apparatus.

A second problem introduced by the utilization of the vacuum stretch technique in the prior art systems is that the apertures which permit passage of the beam between the various evacuated or partially evacuated regions must be relatively large since the beams are focused by a magnetic lens located adjacent the evacuated region and having a long focal length so that the beam is quite wide as it passes through the first few apertures adjacent the accelerator. Such systems required vacuum pumping apparatus of the quite high capacity in order to maintain the various regions of the stretch at their prescribed pressures. In accordance with another aspect of the present invention, the beam is brought to a very fine focus as it passes through each partition or diaphgram between the various evacuated regions so that the apertures between the regions may be quite small. This technique, of course, results in the beam being quite dispersed intermediate the entrance and exit apertures to each particular region and therefore a lens, preferably a magnetic lens, must be associated with each of these regions to produce convergence of the beam at the center of its particular exit aperture. The focal length of each of these lens then must be equal to the distance from the lens to the aperture and the focal length of the last lens must be equal to the distance from the lens to the work piece. More particularly, the work piece is located at the focal point of the lens bearing in mind that the focal point of the lens must not fall outside of 15 percent and preferably 10 percent of the electron beam range for the overall system.

It is an object of the present invention to provide a method and apparatus for electron beam welding in which a work piece to be welded is located at a distance from the point of emergence of the electron beam from the evacuated acceleration region not greater than 15 percent of the electron range of the beam.

It is another object of the present invention to provide an electron beam welding method and apparatus in which the electron beam is formed and accelerated in an evacuated region and is extracted from the evacuated region through a foil window and in which the beam passes through the window in a substantially unfocused condition and is focused on a welding target located at a distance from the window of not more than 10 percent of the electron beam range.

It is another object of the present invention to provide an electron beam welding method and apparatus in which the electron beam is accelerated in an evacuated region and emerges therefrom through a vacuum stretch apparatus having regions separated by diaphragms with small apertures and in which magnetic lenses are provided for causing the electron beam to be focused at the center of each of the apertures in plates defining the various vacuum stretch regions.

It is still another object of the present invention to provide generally a method and apparatus for employing electron beams for welding under atmospheric and near-atmospheric pressures and in which the energy of the beam is such relative to the position of the work piece in the welding region that little of the electron beam energy is dispersed prior to impingement upon the work piece.

The above and still further objects, features and advantages of the present invention will become apparent upon consideration of the following detailed description of one specific embodiment thereof, especially when taken in conjunction with the accompanying drawings, wherein:

FIGURE 3 is a schematic view in elevation of a system for maintaining the welding region filled with a gaseous medium other than air;

FIGURE 4 is a schematic view in elevation of an apparatus for maintaining the gas pressure in a welding region at below but near atmospheric pressure; and FIGURE 5 is a schematic view in elevation of a vacuum stretch technique which permits improved isolation between the various regions of the vacuum stretch.

Figure 1:
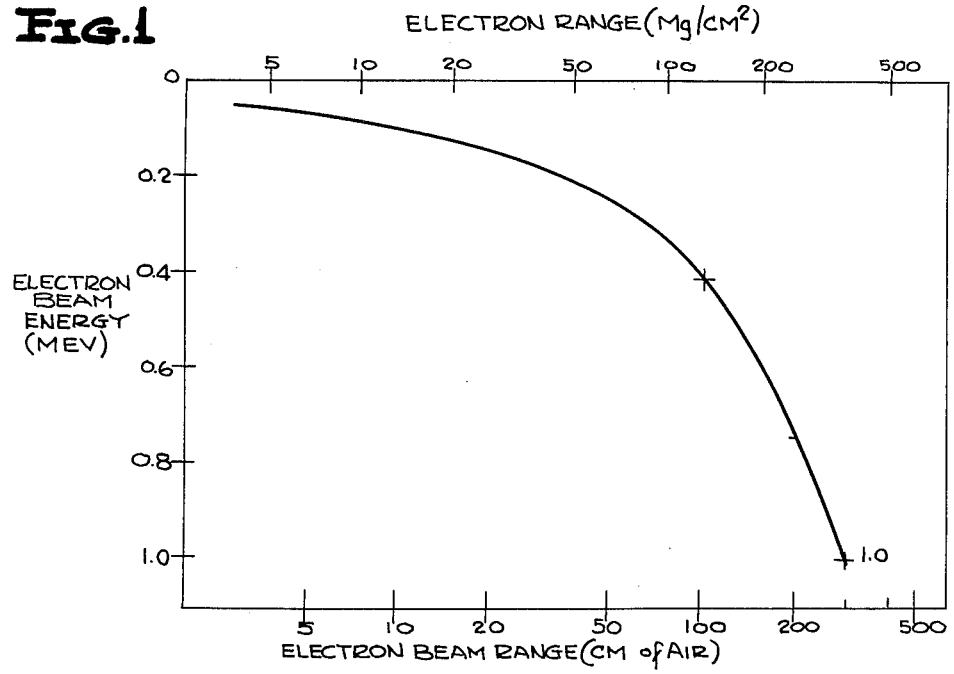
FIGURE 1 is a graph illustrating electron beam range as a function of electron energy.

Referring now specifically to FIGURE 1 of the accompanying drawings, there is illustrated a graph in which the electron beam range expressed in centimeters of air is plotted against electron energy in millions of electron volts. The electron range is plotted along the X-axis of the graph and the electron beam energy is plotted along the Y-axis. As indicated above, the electron beam range is defined as the distance through which the beam travels before it is sufficiently attenuated by scattering and absorption by the gas molecules to be essentially undetectable by conventional beam detection techniques.

Referring to the graph of FIGURE 1, it will be noted that at an electron beam energy of approximately .4 mev.

the electron beam range is 100 centimeters, while at about .74 mev. the electron beam range in air at standard temperature and pressure is 200 centimeters, while at 1.0 mev. the electron range is approximately 300 centimeters. Thus, by operating the electron accelerator at electron energies of 1.0 mev. the election range in air is 300 centimeters and applying the limits as established by the present invention, the work piece may be located as far as 45 centimeters from the point of emergence of the electron beam from the evacuated region of the electron beam accelerator. Although the 15 percent of the electron beam range figure is acceptable, there is some noticeable loss of energy of the beam at this distance and it is preferable to locate the work piece at no greater than 10 percent of the electron beam range at which location the loss in beam energy is sufficiently small to have little effect upon the operation and efficiency of the overall system.

With the electron beam accelerator of the type set forth in the aforesaid U.S. patent, beam currents of 10 milliamps are obtainable at beam energies of 1.0 mev. By employing a simple quadruple lens, a spot diameter of less than one millimeter may be produced, thus providing a power density of over one megawatt per square centimeter at the work surface. This figure is achieved while operating in air with the work piece located at approximately 30 centimeters from a foil window.

Figure 2:
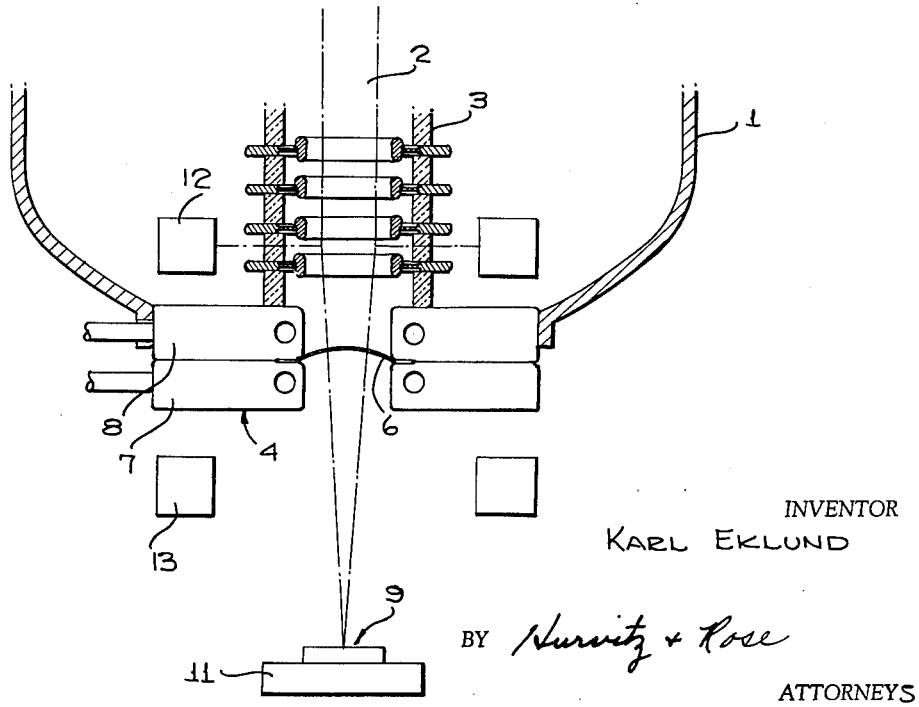
FIGURE 2 is a schematic diagram illustrating the principles of the present invention as applied to an electron beam generator in which the beam is extracted through a foil type window.

Referring now specifically to FIGURE 2 of the accompanying drawings, there is illustrated diagrammatically an apparatus for accomplishing the results set forth immediately above. The apparatus includes a conventional high voltage electron accelerator 1 which may be of the Dynamitron type set forth above. An unfocused electron beam is produced in a beam tube which may be of the type set forth in the copending U.S. patent application Serial No. 124,928 filed July 18, 1961, by Marshall R. Cleland and entitled "Beam Tube."

The tube is secured at its lower end, as illustrated in FIGURE 2, to a window structure generally designated by the reference numeral 4. The window structure includes a titanium or molybdenum foil 6 clamped between water-cooled, hollow annuli 7 and 8. A work piece generally designated by the reference numeral 9 is located below the window 6 on a work piece support 11. The location of the work piece relative to the foil 6 is governed by the principles set forth above. The beam 2 is focused by a simple long focal length quadruple magnetic lens structure 12 illustrated as located internally of the main body of the accelerator 1. Focusing of the beam may also be accomplished by a short focal length lens structure 13 located externally of the machine 1 along the path of the beam 2 or in the alternative both sets of magnetic lenses 12 and 13 may be employed. It should be noted that in the event that the lens 12 is employed; that is, the lens is located internally of the housing of the machine 1, that very little concentration of the beam occurs prior to the beam passing through the window 6. As indicated above, this is essential so that the window is not burned by the passage of the beam therethrough.

Suitable deflection coils may also be provided for sweeping the concentrated beam over the work piece 9 so that an elongated interface between two materials to be welded may be heated by the beam 2 which has a very small diameter at this point. These techniques are conventional and form no part of the invention.

The system of FIGURE 2 is intended to be employed in situations where welding is to be carried out in air at atmospheric temperatures and pressures. Referring now specifically to FIGURE 3 of the accompanying drawings, there is illustrated a method which may be employed to reduce the pressure of the air through which the beam proceeds and therefore increases electron beam range or to employ a different gaseous medium either to increase the electron range by employing a less dense gas or to provide an atmosphere which is less reactive with the material of the work piece than air.

A hood or hollow cylinder 16 extends downwardly from the annular flange 7 of the machine 1 to a point spaced slightly above the upper surface of the work holder 11 so as to define a substantially enclosed region with a small bleeder annulus located between the bottom of he hollow cylinder 16 and the hollow surface 11. A side tube 17 extends through the wall of the hollow cylinder 16 and is adapted to be connected to either a pressure or a vacuum pump. Assuming initially that it is desired to weld in an atmosphere other than air, the pipe 17 is connected to a source of, for instance, helium or argon under pressure which material fills the interior of the hollow cylinder 16 and expels the air between the lower end of the cylinder and the table 11. By producing a constant flow of the desired gas all air is expelled from this region and the welding takes place in the desired atmosphere.

Alternatively, if it is desired to reduce the pressure in the region 15, the side tube 17 may be connected to a high capacity vacuum pump which extracts air from the region 15 normally more rapidly than it can be admitted thereto under the end of the cyliner 16. As a result, the pressure in the region 15 is reduced and the electron range of the beam 2 is increased. It was previously indicated by pumping a gas of one type or another through the side arm 17 into the region 15, the air can be expelled and another medium substituted therefor. This medium need not necessarily increase the electron beam range and in fact in some instances may decrease the range; that is, the material may be more dense than air. However, the elimination of air from the region is often desirable where it is necessary to prevent oxidation of the material of the work piece 9 during welding. The utilization of a more dense gas may require the work piece 9 to be placed at a lesser distance from the window 6 than would be the case if air were maintained in the region. However, when a machine of 1.0 mev. is employed, the electron range of the beam is so great that there is ample distance within the 10 or at most 15 percent range as set forth by the present invention to place the member 9 at a convenient location. It is apparent that in the embodiment of FIGURE 3, the work piece 9 may be conveyed under the machine 1 by a conventional feed mechanism in which case the spacing between the bottom surface of the cylindrical wall 16 and the work support 11 must be sufficient to permit the work piece 9 to pass under the member 16.

Referring now specifically to FIGURE 4 of the accompanying drawings, there is illustrated a mechanism for permitting operation of the system in an atmosphere other than air and at a pressure less than atmospheric. The apparatus is provided with a first or an inner hollow cylinder 18 terminating above the work surface 11 and communicating through a side arm 19 with a vacuum pump to reduce the pressure in the region 20 interior to the cylinder 18. Disposed about the hollow cylinder 18 is a second hollow cylinder 21 which is parallel to the cylinder 18 and also has its lower surface disposed above the work piece 11. The interior 25 of the hollow cylinder 21 communicates through a side arm 22 with a source of, for instance, inert gas at a pressure greater than atmospheric. Gas entering the interior 25 of the member 21 through the side arm 22 now flows under the member 18 and into the region 20 thus purging both of the regions 20 and 25 of air. However, since the interior of the cylinder 18 is at less than atmospheric pressure, the greater portion of the gas entering the region 25 through the side arm 22 flows into the region 20 and only a relatively small proportion of the gas flows into the surrounding atmosphere under the bottom of the cylinder 21. The pump to which the side arm 19 is connected must, if it is desired to maintain this region at less than atmospheric pressure, withdraw gas from this region more rapidly than it can be supplied to this region from the chamber 25. Thus, with this construction, a system operating at less than atmospheric pressure and with a gaseous medium other than air is permissible. This system then may increase or maintain the electron beam range of the medium, even though the gaseous media is more dense than air.

Referring now specifically to FIGURE 5, there is illustrated a vacuum stretch technique for extracting the electron beam from an evacuated region. The beam 2 is accelerated by a beam tube 23 which terminates in a centrally apertured plate 24. The interior of the beam tube 23 is evacuated through a side arm 24, this being illustrated in this manner for purposes of demonstration only, and is maintained in a highly evacuated condition. The plate or diaphragm 24 defines the upper wall of a region having a diaphragm 26 closing the other end thereof. The diaphragm 26 is also centrally apertured and the region between the diaphragms 24 and 26 is connected through a side arm 27 to a vacuum pump which maintains a lesser pressure therein than atmospheric pressure.

In operation, a magnetic lens designated diagrammatically as the member 28 has a focal length such that the beam is focused at the center of the aperture in the diaphragm 24. The beam then diverges and reaches a maximum divergence as determined by a second magnetic lens arrangement 29 located between the diaphragms 24 and 26. The beam is again caused to converge and have a focal point at the center of the aperture in the disc 26. The beam again diverges and convergence to a focal point on a work piece is controlled by a lens system 31. Since the beam is focused at the center of each of the apertures in the diaphragms 24 and 26, it may have a diameter of one millimeter or less at the point where the beam passes from the highly evacuated region into the less evacuated region and finally into the atmosphere. As a result, the apertures in the members 24 and 26 may be made exceedingly small so that the problem normally encountered in the vacuum stretch technique of maintaining the proper pressures in each of the regions is materially reduced since communication between these regions is through extremely small apertures. As a result, the number of regions required in the stretch mechanism may be materially reduced or, alternatively, the capacity of the vacuum pumps associated with each region may be materially reduced.

In a practical system several stretch regions must normally be employed, the single region being employed to simplify the drawing.

The range of the electron beam in the system of FIGURE 5 must be calculated from the point at which the beam passes through the diaphragm 24 or more particularly must reflect the scattering and absorption of the beam in the stretch apparatus; that is, the region between the diaphragms 24 and 26 in the drawing. The positioning of the work piece 9 therefore must be determined on the basis of the entire electron beam range from the diaphragm 24 to the work piece. The loss of range however in the stretch region is, of course, considerably less than in a comparable air region and, in consequence, suitable spacing may be obtained between the work piece 9 and the diaphragm 26.

As indicated above, the problem of maintaining proper isolation between the evacuated beam tube and the atmosphere is materially lessened by the method and apparatus of the present invention and this fact coupled with the utilization of a high energy beam renders practical electron beam welding in a medium at atmospheric pressures where a vacuum stretch apparatus is employed as the beam extraction mechanism. Alternatively, of course, if it is desired to operate in a somewhat evacuated region, the apparatus of the type illustrated in FIGURES 2–4 may be employed in which case the problem of maintaining appropriate pressures in the various stretch regions is still further reduced.

The present invention has been described as applicable to electron beam welding but it is to be understood that the method and apparatus are equally applicable to electron beam heating and drilling. The particular operation achieved is a function of the total energy delivered to the work piece which may be controlled by spot diameter, beam energy and/or time.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A method of electron beam welding, heating, and the like comprising producing a high velocity beam of electrons in an evacuated chamber, bringing the beam of electrons out of said evacuated chamber through a vacuum stretch including a plurality of chambers interconnected with each other and the evacuated region through small apertures aligned along the axis of the beam, maintaining the chambers at increasing pressures relative to the direction of travel of the beam, locating a work piece externally of the vacuum stretch and along the path of travel of the beam, subjecting the beam to successive focusing fields so that the beam is sharply focused at approximately the center of each of the apertures and at the work piece, the work piece being located at a distance from the evacuated chamber no greater than 15 percent of the range of the electron beam externally of the evacuated chamber.

2. A method of electron beam welding, heating, and the like comprising producing a high velocity beam of electrons in an evacuated chamber, bringing the beam of electrons out of said evacuated chamber through a vacuum stretch including a plurality of chambers interconnected with each other and the evacuated region through small apertures aligned along the axis of the beam, maintaining the chambers at increasing pressures relative to the direction of travel of the beam, locating a work piece externally of the vacuum stretch and along the path of travel of the beam, subjecting the beam to successive focusing fields so that the beam is sharply focused at approximately the center of each of the apertures and at the work piece the work piece being located at a distance from the evacuated chamber no greater than 10 percent of the electron beam range externally of the evacuated chamber.

3. An electron beam apparatus for welding, heating, and the like comprising means for producing a high velocity beam of electrons in an evacuated chamber, an electron beam window located along the path of said electron beam and sealing one end of said chamber, means for locating a work piece in a predetermined atmosphere at a predetermined pressure externally of said chamber, said means for locating positioning a work piece so as to intercept said beam at a distance from said electron beam window no greater than approximately 15 percent of the beam range in said atmosphere at said pressure, and means for focusing said beam located such that said beam is substantially defocused at said electron beam window and is focused on a work piece.

4. The combination according to claim 3 wherein said electron beam has an energy of at least 0.4 mev.

5. An electron beam apparatus for welding, heating, and the like comprising means for producing a high velocity beam of electrons in an evacuated chamber, a vacuum stretch including a plurality of chambers separated from one another, the evacuated chamber and a predetermined atmosphere at a predetermined pressure by a plurality of partitions having small centrally located apertures aligned along the axis of said beam, said plurality of chambers being maintained at increasing pressures relative to the pressure of said evacuated chamber along the direction of travel of said beams, means for locating a work piece in said predetermined atmosphere at said predetermined pressure, said means for locating positioning a work piece so as to intercept said beam at a distance no greater than approximately 15 percent of the electron beam range in said atmosphere at said pressure from the one of said partitions located at the greatest distance from the work piece, and forming means for producing a sharp focus of said electron beam at the center of each of said apertures in said partitions and at said work piece, said apertures in said partitions being of a size of the order of the diameter of the beam at its points of sharp focus.

6. The combination according to claim 5 wherein said electron beam has an energy of at least 0.4 mev.

References Cited by the Examiner
UNITED STATES PATENTS

| | | |
|---|---|---|
| 2,423,729 | 7/47 | Ruhle. |
| 2,883,544 | 4/59 | Robinson. |
| 2,961,561 | 11/60 | Westendorp. |
| 2,981,823 | 4/61 | Candidus _____ 219—117 |
| 3,082,316 | 3/63 | Greene _____ 219—117 |

RICHARD M. WOOD, *Primary Examiner.*

ANTHONY BARTIS, *Examiner.*